(12) United States Patent
Brooke (10) Patent No.: US 10,941,981 B2
(45) Date of Patent: Mar. 9, 2021

(54) REFRIGERATION APPLIANCES AND METHODS OF MINIMIZING NOISE IMPACT

(71) Applicant: Haier US Appliance Solutions, Inc., Wilmington, DE (US)

(72) Inventor: Richard Dana Brooke, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 48 days.

(21) Appl. No.: 16/401,302

(22) Filed: May 2, 2019

(65) Prior Publication Data

US 2020/0348076 A1    Nov. 5, 2020

(51) Int. Cl.
*F25B 29/00* (2006.01)
*F25D 29/00* (2006.01)

(52) U.S. Cl.
CPC .......... *F25D 29/00* (2013.01); *F25D 2600/02* (2013.01); *F25D 2600/04* (2013.01)

(58) Field of Classification Search
CPC ... F28D 29/00; F28D 2600/02; F28D 2600/04
USPC .......................................................... 165/247
See application file for complete search history.

(56) References Cited

U.S. PATENT DOCUMENTS

| | | | |
|---|---|---|---|
| 5,779,450 A | 7/1998 | Fujiwara et al. | |
| 9,470,451 B2 | 10/2016 | Kim et al. | |
| 2012/0050037 A1* | 3/2012 | Brian | H04L 12/2827 340/540 |
| 2014/0260409 A1* | 9/2014 | Junge | F25D 29/003 62/419 |
| 2015/0337831 A1* | 11/2015 | Zhou | F04B 49/20 700/276 |

FOREIGN PATENT DOCUMENTS

KR    20050056722 A    6/2005
KR    20060128190 A    12/2006

* cited by examiner

*Primary Examiner* — Davis D Hwu
(74) *Attorney, Agent, or Firm* — Dority & Manning, P.A.

(57) ABSTRACT

A refrigerator appliance may be provided that includes a housing, a first fluid-motivating unit (FMU), a second FMU, and a controller. The housing may define a chilled chamber. The first FMU may be mounted to the housing. The second FMU may be mounted to the housing apart from the first FMU. The controller may be in operable communication with the first FMU and the second FMU. The controller may be configured to initiate a cooling operation. The cooling operation may include activating the first FMU to generate a first fluid flow, increasing a speed setting of the first FMU gradually at a first predetermined ramp rate, activating the second FMU subsequent to activating the first FMU to generate a second fluid flow, and increasing a speed setting of the second FMU gradually.

20 Claims, 6 Drawing Sheets

REFRIGERATION APPLIANCES AND METHODS OF MINIMIZING NOISE IMPACT

FIELD OF THE INVENTION

The present subject matter relates generally to refrigeration appliances, such as air conditioning and refrigerator appliances, and more particularly to features and methods for minimizing the impact of noise generated by such appliances.

BACKGROUND OF THE INVENTION

The amount of noise generated by refrigeration appliances (e.g., refrigerator appliances, air conditioning appliances, etc.) has generally decreased over time. Advances in technology allow modern consumer appliances to generate less noise than most consumer appliances did several years ago. Advanced damping materials have also reduced the amount of audible noise that modern appliances emit. However, excessive or undesirable noise from a refrigeration appliance (e.g., within a room that houses the refrigeration appliance) remains a constant concern for users.

These concerns may be heightened if a refrigeration appliance includes multiple fluid-motivating units, such as pumps, compressors, or fans, that operate according to different speeds and schedules. Although such appliances may be more efficient than previous appliances since they may respond to and change their operation in response to different conditions (e.g., ambient temperatures, use load, etc.), the noise generated may be even more perceptible. As an example, it may be more noticeable for a user that a fan's speed switches instantly between multiple settings (e.g., low and high settings) then it would be to maintain the fan at a single speed setting. As another example, it may be more noticeable for a user that a fan and a compressor are suddenly activated separately than it would be if the fan and compressor were activated simultaneously, since multiple sudden increases in noise may draw the user's attention. In either example, the stark and immediate changes in noise generated by the appliance (i.e., variable noise level) may be more readily perceived than a single, sustained noise level, even if the sustained noise level was greater in magnitude (e.g., as measured in decibels—dBs) than the variable noise level. As a result, the variable noise level will often disturb users and reduce their overall enjoyment of a given appliance.

Attempts have been made to mask or cancel out noise by using sound (e.g., anti-noise signals) in a phase opposite of the phase of the noise. However, such systems generally increase the overall complexity and cost of an appliance. For instance, active sound sources, such as speakers, are required to transmit such sounds. These components may specifically increase material costs and complexity for assembly. Moreover, it can be difficult to implement active sound masking in environments where the sound to be masked changes rapidly in volume or frequency.

Therefore, it would be useful to provide a consumer appliance configured to address one or more of the above identified issues. In particular, it may be advantageous to provide a refrigeration appliance having features for minimizing the detectable impact (e.g., auditory impact perceived by users) caused by one or more fluid-motivating units therein.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a refrigeration appliance is provided. The method may include activating a first fluid-motivating unit (FMU) to generate a first fluid flow. The method may also include increasing a speed setting of the first FMU gradually to a first operational speed setting over a first predetermined ramp period at a first predetermined ramp rate. The method may further include activating a second FMU subsequent to activating the first FMU to generate a second fluid flow. The method may still further include increasing a speed setting of the second FMU gradually to a second operational speed setting over a second predetermined ramp period at a second predetermined ramp rate.

In another exemplary aspect of the present disclosure, a refrigerator appliance is provided. The refrigerator appliance may include a housing, a first fluid-motivating unit (FMU), a second FMU, and a controller. The housing may define a chilled chamber. The first FMU may be mounted to the housing to generate a first fluid flow on the refrigeration appliance. The second FMU may be mounted to the housing apart from the first FMU to generate a second fluid flow on the refrigeration appliance. The controller may be in operable communication with the first FMU and the second FMU. The controller may be configured to initiate a cooling operation. The cooling operation may include activating the first FMU to generate the first fluid flow, increasing a speed setting of the first FMU gradually to a first operational speed setting over a first predetermined ramp period at a first predetermined ramp rate, activating the second FMU subsequent to activating the first FMU to generate the second fluid flow, and increasing a speed setting of the second FMU gradually to a second operational speed setting over a second predetermined ramp period at a second predetermined ramp rate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
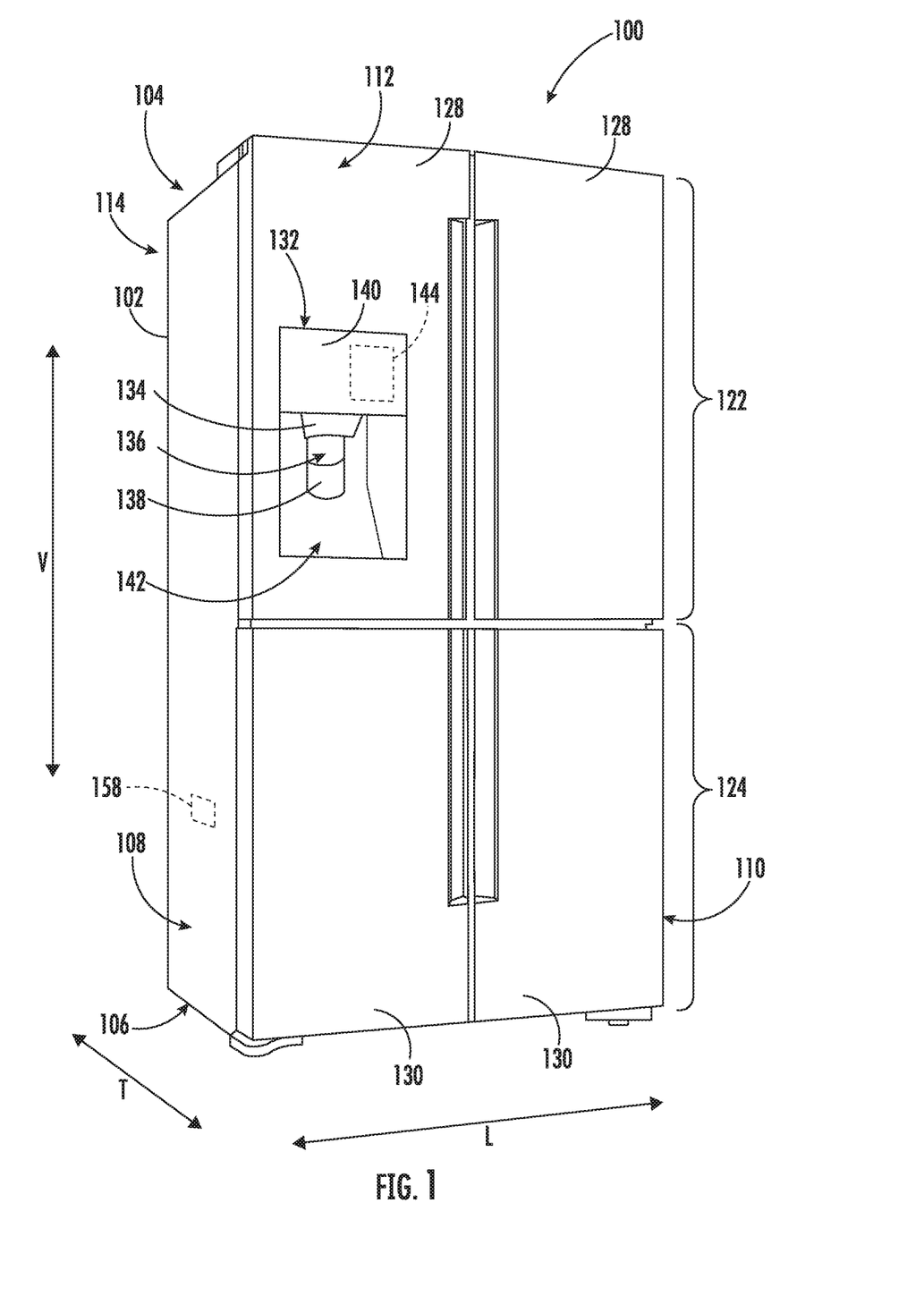
FIG. 1 provides a perspective view of a refrigerator appliance according to exemplary embodiments of the present disclosure.
Figure 2:
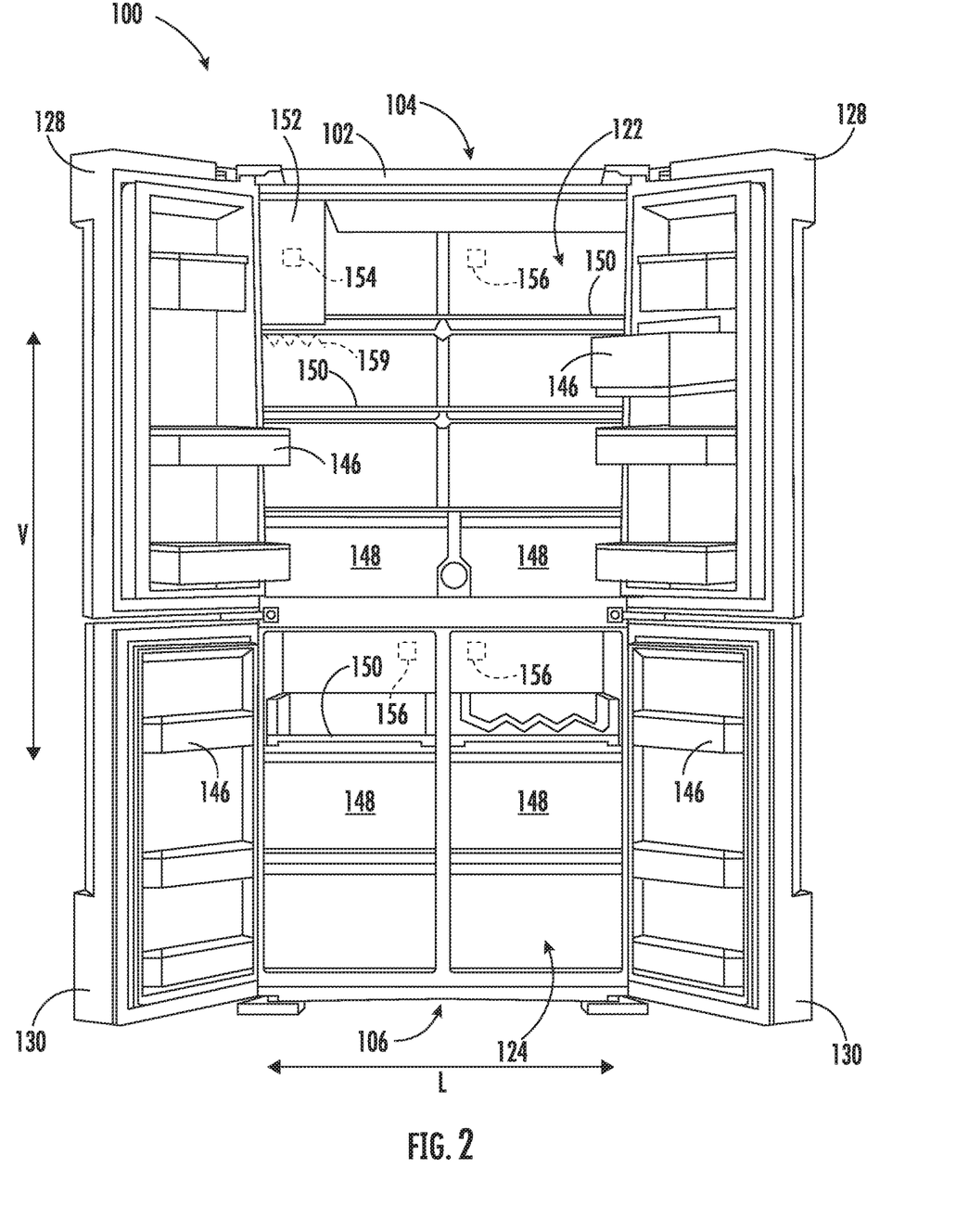
FIG. 2 provides a front view of the exemplary refrigerator appliance of FIG. 1 with the refrigerator and freezer doors shown in an open position.

Turning now to the figures, FIG. 1 provides a perspective view of a refrigeration appliance. Specifically, FIG. 1 provides a refrigerator appliance 100 according to exemplary embodiments of the present disclosure. FIG. 2 provides a front view of refrigerator appliance 100 with refrigerator doors 128 and freezer doors 130 shown in an open position.

Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines a fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigeration appliances (e.g., a top mount refrigerator appliance, a side-by-side style refrigerator appliance, a packaged terminal air conditioner appliance, a packaged central air conditioner appliance, a split-system air conditioner system, etc.). Consequently, the description set forth herein is for illustrative purposes only and is not intended to be limiting in any aspect to any particular refrigeration appliance configuration.

Figure 3:
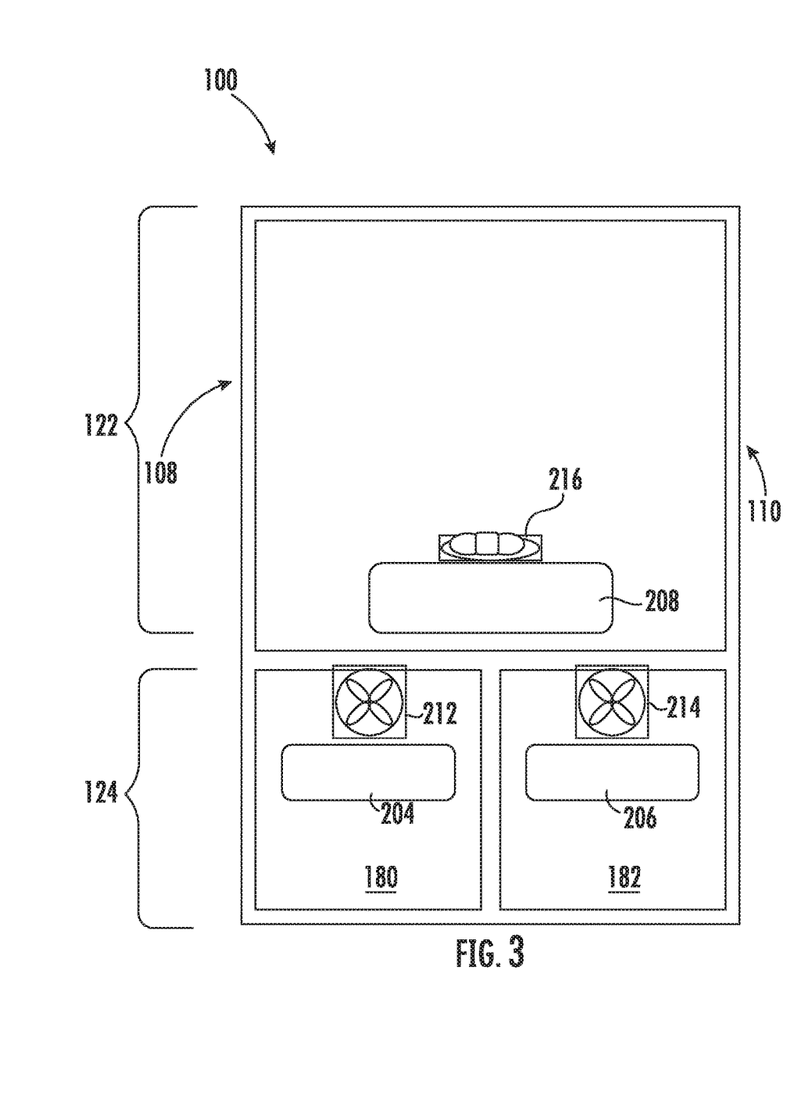
FIG. 3 provides a front schematic view of the exemplary refrigerator appliance of FIG. 1 with refrigerator and freezer doors removed for clarity.

In the illustrated embodiments, freezer chamber 124 generally extends between a left wall and a right wall along the lateral direction L, between a bottom wall and a top wall along the vertical direction V, and between a chamber opening and a back wall along the transverse direction T. In optional embodiments, refrigerator appliance 100 further includes a mullion positioned within freezer chamber 124 to divided freezer chamber 124 into a first freezer compartment and a second freezer compartment. Optionally, the mullion may generally extend between the chamber opening and the back wall along the transverse direction T and between the bottom wall and the top wall along the vertical direction V. In this manner, the mullion may be generally vertically-oriented and split freezer chamber 124 into two (e.g., equally-sized) compartments 180, 182 (FIG. 3).

Refrigerator doors 128 are rotatably hinged to an edge of housing 102 for selectively accessing fresh food chamber 122. Similarly, freezer doors 130 are rotatably hinged to an edge of housing 102 for selectively accessing freezer chamber 124. To prevent leakage of cool air, refrigerator doors 128, freezer doors 130, or housing 102 may define one or more sealing mechanisms (e.g., rubber gaskets) at the interface where the doors 128, 130 meet housing 102. Refrigerator doors 128 and freezer doors 130 are shown in the closed position in FIG. 1 and in the open position in FIG. 2.

Refrigerator appliance 100 also includes a dispensing assembly 132 for dispensing liquid water or ice. Dispensing assembly 132 includes a dispenser 134 positioned on or mounted to an exterior portion of refrigerator appliance 100 (e.g., on one of refrigerator doors 128). Dispenser 134 includes a discharging outlet 136 for accessing ice and liquid water. An actuating mechanism 138, shown as a paddle, is mounted below discharging outlet 136 for operating dispenser 134. In alternative exemplary embodiments, any suitable actuating mechanism may be used to operate dispenser 134. For example, dispenser 134 can include a sensor (e.g., an ultrasonic sensor) or a button rather than the paddle. A control panel 140 is provided for controlling the mode of operation. For example, control panel 140 includes a plurality of user inputs (not labeled), such as a water dispensing button and an ice-dispensing button, for selecting a desired mode of operation such as crushed or non-crushed ice.

Discharging outlet 136 and actuating mechanism 138 are an external part of dispenser 134 and are mounted in a dispenser recess 142. Dispenser recess 142 is positioned at a predetermined elevation convenient for a user to access ice or water and enabling the user to access ice without the need to bend-over and without the need to open refrigerator doors 128. In the exemplary embodiment, dispenser recess 142 is positioned at a level that approximates the chest level of a user. According to an exemplary embodiment, the dispensing assembly 132 may receive ice from an icemaker 152 disposed in a sub-compartment of a chilled chamber (e.g., the fresh food chamber 122). As would be understood, icemaker 152 may include one or more water valves for selectively supplying liquid water for freezing. Additionally or alternatively, one or more heating elements 159 may be provided within the icemaker 152 or elsewhere within refrigerator appliance 100 (e.g., to selectively heat portions of an icemaker mold body or defrost various portions of refrigerator appliance 100). For instance, refrigerator appliance 100 may further include a heating element 159 positioned within fresh food chamber 122 or freezer chamber 124. In such embodiments, heating element 159 is generally configured for raising the temperature of the corresponding fresh food chamber 122 (e.g., an evaporator thereof) or freezer chamber 124 (e.g., evaporator thereof). Additionally or alternatively, a heating element 159 may be positioned to assist in preventing undesired freezing or facilitate thawing of an evaporator 198 (e.g., via conduction or by heating air circulated across the evaporator 198). Generally, heating element 159 may include one or more heating elements, such as a strip resistance heater, heating coils, or any other suitable heating elements.

In some embodiments, refrigerator appliance 100 further includes a controller 144. Operation of the refrigerator appliance 100 may be generally regulated by controller 144 that is operatively coupled to control panel 140. In exemplary embodiments, control panel 140 represents a general purpose I/O ("GPIO") device or functional block. In other exemplary embodiments, control panel 140 includes input components, such as one or more of a variety of electrical, mechanical or electro-mechanical input devices including rotary dials, push buttons, touch pads, and touch screens. Control panel 140 may be in communication with controller 144 via one or more signal lines or shared communication busses. Control panel 140 provides selections for user manipulation of the operation of refrigerator appliance 100. In response to user manipulation of the control panel 140, controller 144 operates various components of refrigerator appliance 100. For example, controller 144 is operatively coupled or in communication with various components of a sealed cooling system 190 (FIGS. 3 and 4), as discussed below. Controller 144 may also be in communication with a variety of sensors, such as, for example, chamber temperature sensors 156 or ambient temperature sensors 158. Controller 144 may receive signals from these temperature sensors 156, 158 that correspond to the temperature of an atmosphere or air within their respective locations. Moreover, controller 144 may initiate one or more operations (e.g., cooling operations) based on signals received from the control panel 140, sensors 156, 158, or another suitable portion of refrigerator appliance 100.

Controller 144 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. In some embodiments, the processor executes non-transitory programming instructions stored in memory. For certain embodiments, the instructions include a software package configured to operate appliance 100 and, for example, execute an operation routine including the example method 600 described below with reference to FIG. 6. The memory can be a separate component from the processor or can be included onboard within the processor. Alternatively, controller 144 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

In some embodiments, various storage components are mounted within fresh food chamber 122 and freezer chamber 124 to facilitate storage of food items therein as will be understood by those skilled in the art. In particular, the storage components include bins 146, drawers 148, and shelves 150 that are mounted within fresh food chamber 122 or freezer chamber 124. Bins 146, drawers 148, and shelves 150 are configured for receipt of food items (e.g., beverages or solid food items) and may assist with organizing such food items. As an example, drawers 148 can receive fresh food items (e.g., vegetables, fruits, or cheeses) and increase the useful life of such fresh food items.

Figure 4:
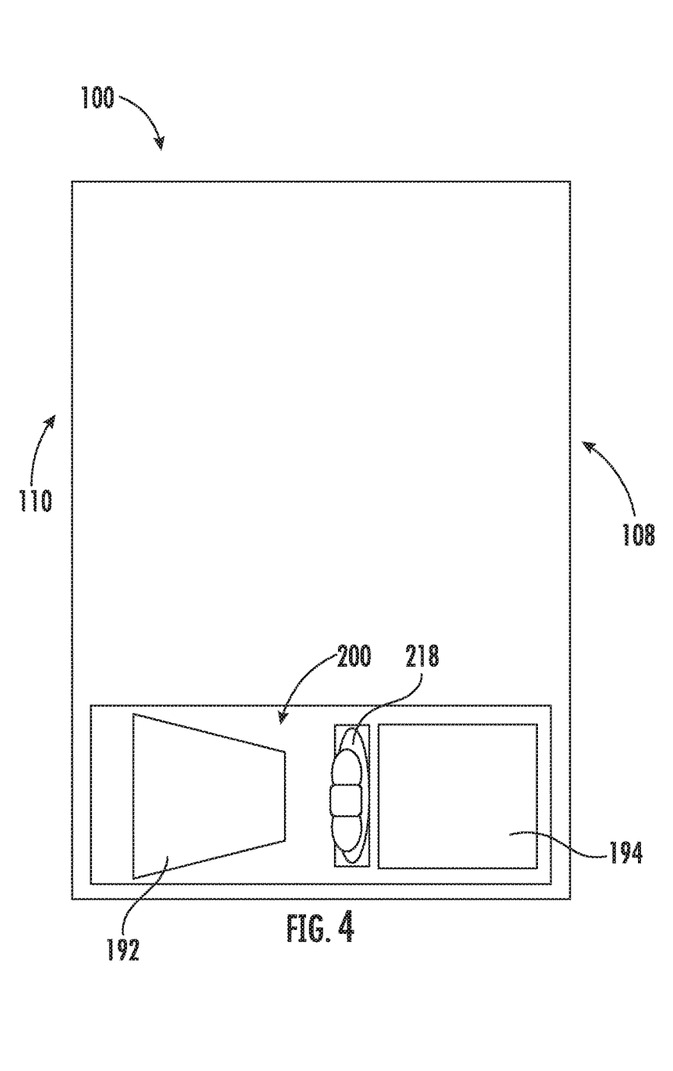
FIG. 4 provides a rear schematic view of the exemplary refrigerator appliance of FIG. 1.
Figure 5:
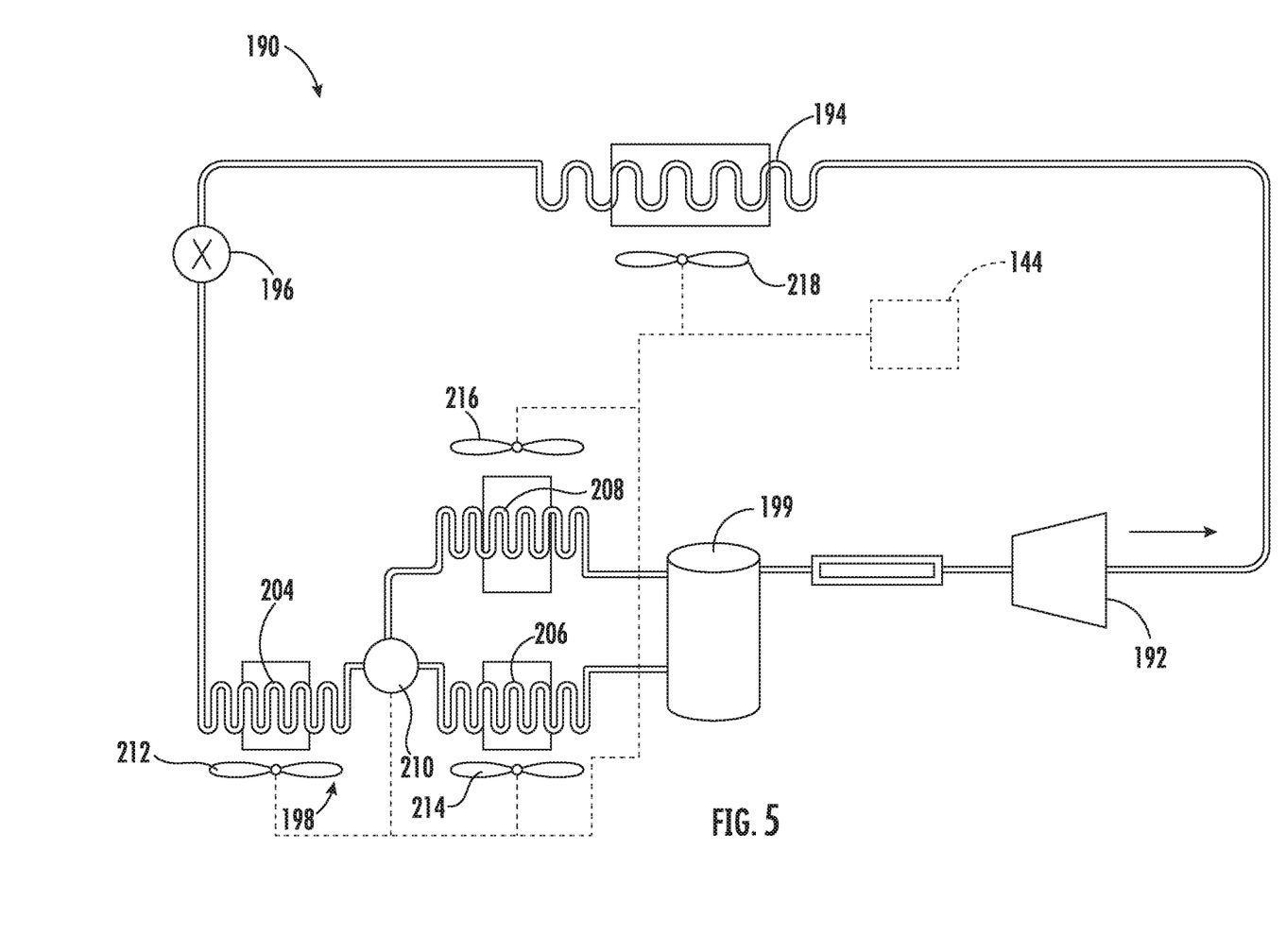
FIG. 5 provides a schematic view of a sealed cooling system for an exemplary refrigerator appliance.

Turning now to FIGS. 3 through 5, multiple schematic views of refrigerator appliance 100 are provided to illustrate, for example, various portions of a sealed cooling system 190. Specifically, FIG. 3 provides a front schematic view illustrating portions of sealed cooling system 190 within or in thermal communication with the chilled chambers 122, 124. For FIG. 3, it is noted that the doors 128,130 (FIG. 1) have been removed for clarity. FIG. 4 provides a rear schematic view illustrating the portions of sealed cooling system 190 on or within a rear portion (e.g., machinery compartment 200) of refrigerator appliance 100 that is spaced apart from chilled chambers 122, 124 (FIG. 3).

Sealed cooling system 190 is generally configured for executing a vapor compression cycle for cooling air within refrigerator appliance 100 (e.g., within fresh food chamber 122 and freezer chamber 124). One or more fluid-motivating units (FMUs) (e.g., compressors, fans, blowers, pumps, etc.) are provided to motivate a corresponding fluid, such as a refrigerant fluid or air, through sealed cooling system 190 (e.g., as in the case of a compressor) or across a portion of sealed cooling system 190 (e.g., as in the case of a fan).

In certain embodiments, one or more FMUs are provided with multiple operational speed settings (e.g., a low speed setting, a medium speed setting, and a high speed setting). Each operational speed setting may be a predetermined speed setting that generally corresponds to a desired volumetric flow rate for a fluid to flow across or through the FMU. A low speed setting of the FMU may correspond to a relatively slow volumetric flow rate; a medium speed setting of the FMU may correspond to a middling volumetric flow rate that is greater than that of the low speed setting; a high speed setting of the FMU may correspond to a relatively fast volumetric flow rate that is greater than that of the low speed setting or the medium setting. Thus, one or more FMUs may be a variable-speed FMU (e.g., variable speed compressor, variable speed fan, variable speed blower, variable speed pump, etc.).

In the illustrated embodiments, sealed cooling system 190 includes at least one FMU (e.g., a first FMU or compressor 192), a condenser 194, an expansion device 196, and an evaporator 198 connected in series and charged with a refrigerant. In some embodiments, during operation of sealed cooling system 190, gaseous refrigerant flows into compressor 192 (e.g., provided as a variable speed compressor), which operates to increase the pressure of the refrigerant. This compression of the refrigerant raises its temperature, which is lowered by passing the gaseous refrigerant through condenser 194. Within condenser 194, heat exchange with ambient air takes place so as to cool the refrigerant and cause the refrigerant to condense to a liquid state. In optional embodiments, at least one FMU (e.g., a second FMU or condenser fan 218) is directed toward condenser 194 (e.g., within machinery compartment 200) to selectively assist in exchanging heat with the condenser 194 and ambient air. For example, refrigerator appliance 100 may include a condenser fan 218 (e.g., provided as a variable speed fan) in fluid communication with machinery compartment 200 for urging air across condenser 194.

Expansion device 196 may be provided as, for example, a valve, capillary tube, or other restriction device that receives liquid refrigerant from condenser 194. From expansion device 196, the liquid refrigerant enters evaporator 198. Upon exiting expansion device 196 and entering evaporator 198, the liquid refrigerant drops in pressure and vaporizes. Due to the pressure drop and phase change of the refrigerant, evaporator 198 is cool relative to fresh food and freezer chambers 122 and 124 of refrigerator appliance 100. As such, cooled air is produced and refrigerates fresh food and freezer chambers 122 and 124 of refrigerator appliance 100. Thus, evaporator 198 is a type of heat exchanger which transfers heat from air passing over evaporator 198 to refrigerant flowing through evaporator 198.

It should be appreciated that the illustrated sealed cooling system 190 is only an exemplary configuration of sealed cooling system 190 that may include additional components (e.g., one or more additional evaporators, compressors, expansion devices, or condensers). As an example, sealed cooling system 190 may further include an accumulator 199. Accumulator 199 may be positioned downstream of evaporator 198 and may be configured to collect condensed refrigerant from the refrigerant stream prior to passing it to compressor 192.

Referring generally to FIGS. 3 and 4, a portion of evaporator 198 may be positioned within freezer chamber 124 (e.g., adjacent to the back wall of an inner liner of freezer chamber 124). In additional or alternative embodiments, a portion of evaporator 198 is positioned on or within fresh food chamber 122 (e.g., adjacent a back wall of an inner liner of fresh food chamber 122). Other components of sealed cooling system 190 (e.g., compressor 192 and condenser 194) may be located within a machinery compartment 200 of refrigerator appliance 100.

In the illustrated embodiments, evaporator 198 includes a first evaporator section 204, a second evaporator section 206, and a third evaporator section 208. First evaporator section 204, second evaporator section 206, and third evaporator section 208 may be connected in fluid communication (e.g., in series or parallel) such that refrigerant passes first through first evaporator section 204 before second evaporator section 206 or third evaporator section 208. In exemplary embodiments, first evaporator section 204 is connected to second evaporator section 206 and third evaporator section 208 by a fixed conduit branch or. In alternative embodiments, such as those illustrated in FIG. 5, first evaporator section 204 is connected to the evaporator sections 206, 208 by a multi-path valve 210 configured to selectively direct refrigerant to second evaporator section 206 and third evaporator section 208. As illustrated, first evaporator section 204 is positioned within first freezer compartment 180, second evaporator section 206 is positioned within second freezer compartment 182, and third evaporator section 208 is positioned within fresh food chamber 122. It should be appreciated, however, that according to alternative embodiments, any other suitable configuration for evaporator 198 is possible and within the scope of the disclosure.

Refrigerator appliance 100 may further include one or more FMUs, such as fans, to assist in circulating air through evaporator 198 and one or more of the chilled chambers 122, 124. As an example, refrigerator appliance 100 may include at least one FMU (e.g., a third FMU or first fan 212) in fluid communication with first evaporator section 204 for urging air across first evaporator section 204. Optionally, first fan 212 is provided as a variable speed fan. As an additional or alternative example, refrigerator appliance 100 may include at least one FMU (e.g., a fourth FMU or second fan 214) in fluid communication with second evaporator section 206 for urging air across second evaporator section 206. Optionally, second fan 214 is provided as a variable speed fan. As another additional or alternative example, refrigerator appliance 100 may include at least one FMU (e.g., a fifth FMU or third fan 216) in fluid communication with third evaporator section 208 for urging air across third evaporator section 208. Optionally, third fan 216 is provided as a variable speed fan.

As is understood, one or more fans (e.g., fan 212, 214, 216, 218) within refrigerator appliance 100 may be provided as any suitable air fan (e.g., axial fan, radial blower, etc.) in fluid communication with a corresponding heat exchanger (e.g., first evaporator section 204, second evaporator section 206, third evaporator section 208, condenser 194, etc.). As an example, first fan 212 may be an axial fan positioned between the first evaporator section 204 and first freezer compartment 180 to selectively circulate air and facilitate heat exchange between the same. As another example, second fan 214 may be an axial fan positioned between the second evaporator section 206 and second freezer compartment 182 to selectively circulate air and facilitate heat exchange between the same. As yet another example, third fan 216 may be an axial fan positioned between the third evaporator section 208 and fresh food chamber 122 to selectively circulate air and facilitate heat exchange between the same. As still another example, condenser fan 218 may be an axial fan positioned within machinery compartment 200 to circulate air therein.

Although the FMUs (e.g., 192, 212, 214, 216, and 218) may generally be activated and controlled according to the cooling needs of refrigerator appliance 100, activation and operation (e.g., speed settings) of the FMUs may be staggered or sequenced, as will be described below.

Figure 6:
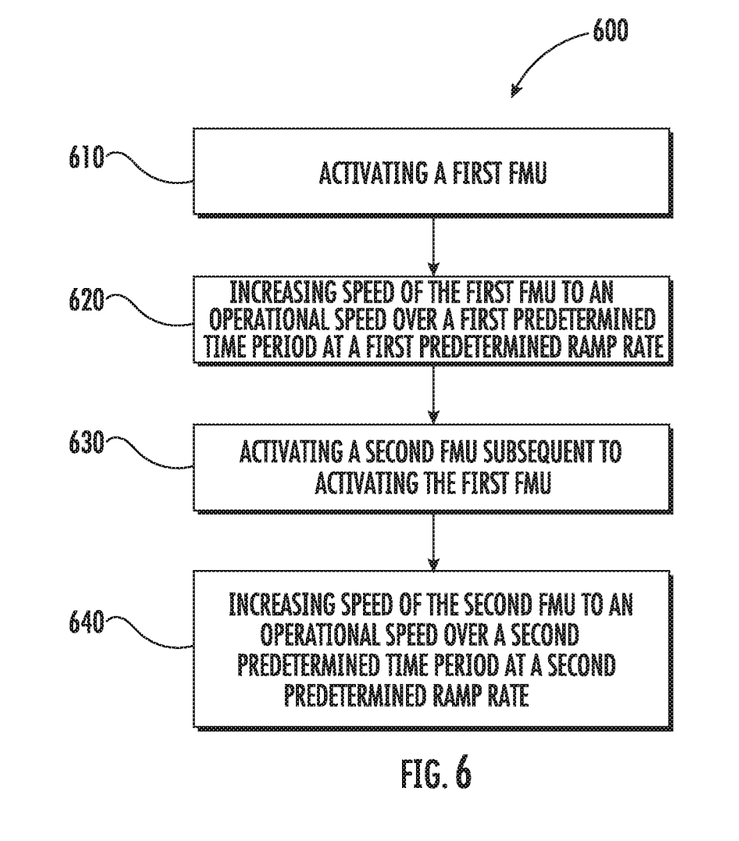
FIG. 6 provides a flow chart illustrating a method of operating a refrigeration appliance according to exemplary embodiments of the present disclosure.

Turning now to FIG. 6, a flow chart is provided of a method 600 according to exemplary embodiments of the present disclosure. Generally, the method 600 provides a method of operating a refrigeration appliance, such as refrigerator appliance 100 (FIG. 1) that includes multiple FMUs as described above. The method 600 can be performed, for instance, by the controller 144 (FIG. 1). For example, controller 144 may, as discussed, be operatively coupled to one or more FMUs (e.g., 192, 212, 214, 216, and 218), chamber sensor 156, ambient sensor 158, or user control panel 140. During operations, controller 144 may send signals to and receive signals from FMUs (e.g., 192, 212, 214, 216, and 218), chamber sensor 156, ambient sensor 158, or user control panel 140. Controller 144 may further be operatively coupled to other suitable components of the appliance 100 to facilitate operation of the appliance 100 generally.

At 610, the method 600 includes activating a first FMU to generate a first fluid flow. Generally, the first FMU may begin operation from rest such that the first fluid flow is started after being generally static (e.g., at a fluid flow speed of zero). The first FMU may be provided as, for example, a compressor, fan, blower, pump, or any other actively-powered component for motivating fluid (e.g., refrigerant, water, air, etc.) across a relatively-static body. As an example, if the first FMU is provided as a compressor, 610 may include starting the compressor such that refrigerant is flowed through a sealed cooling system. As another example, if the first FMU is provided as a fan, 610 may include rotating the fan from rest such that an active airflow is generated across a fan casing and within a corresponding chamber or compartment (e.g., as described above). In some such embodiments, the fan is a condenser fan, as described above.

In certain embodiments, the first FMU is provided as the loudest of a plurality of FMUs. In other words, the first FMU may be the FMU that generates the highest magnitude of noise at its corresponding operational speed setting (e.g., as measured in decibels from a position in front of the refrigeration appliance, as would be assumed by a user during use of the refrigeration appliance).

In some embodiments, 610 is initiated or prompted by receiving a cooling signal. Generally, the cooling signal may generally indicate that activation of one or more FMUs would be desirable (e.g., to cool or otherwise lower the temperature within a portion of refrigeration appliance). A determination that cooling is necessary may be made according to one or more methods or sequences, as is generally understood. In optional embodiments, the cooling signal indicates that the corresponding temperature sensor has detected at a portion of the refrigeration appliance has risen above a set temperature limit. For instance, a cooling signal may be received from one or more temperature sensors, such as those described above. In additional or alternative embodiments, the cooling signal indicates that an ice-dispensing operation has been initiated. For instance, the cooling signal may be received from the dispenser in response to a user actuating the actuating mechanism or paddle. Advantageously, activation the first FMU may mask noise generated by a heater element, movement of ice falling from or within the refrigeration appliance, activation of a water valve directing water to refill the icemaker, etc.

At 620, the method 600 includes increasing a speed setting of the first FMU gradually to a first operational speed setting over a first predetermined ramp period at a first predetermined ramp rate. Thus, 620 generally follows 610 and provides an operational speed setting that is greater than zero. In some embodiments, the first operational speed setting is a predetermined speed setting that generally corresponds to a desired volumetric flow rate for a fluid to flow across or through the first FMU. The first predetermined ramp rate is a rate of increase to gradually raise the speed setting of the first FMU (e.g., from zero or rest). The gradual increase may continue over several seconds (e.g., 3 to 5 seconds) and cease in response to the first FMU reaching the first operational speed setting. Once the first operational speed setting is reached, the first FMU may continue to operate at the first operational speed (e.g., until a new operational speed setting is desired for the first FMU, the cooling operation ends, or activation of the first FMU is no longer desired). Advantageously, the gradual increase in speed may be less audibly perceptible (e.g., to a user) than an immediate unrestricted increase from rest to the first operational speed setting.

At 630, the method 600 includes activating a second FMU (e.g., to generate a second fluid flow) subsequent to activating the first FMU. In other words, 630 occurs or commences only after 610. Generally, the second FMU may begin operation from rest such that the second fluid flow is started after being generally static (e.g., at a fluid flow speed of zero). The second FMU may be provided as, for example, a compressor, fan, blower, pump, or any other actively-powered component for motivating fluid (e.g., refrigerant, water, air, etc.) across a relatively-static body. As an example, if the second FMU is provided as a compressor, 630 may include starting the compressor such that refrigerant is flowed through sealed cooling system. As another example, if the second FMU is provided as a fan, 630 may include rotating the fan from rest such that an active airflow is generated across the fan and within a corresponding chamber or compartment (e.g., as described above). Advantageously, at least a portion of the noise generated by the second FMU may be masked by the noise generated by the first FMU.

In some embodiments, activation of the second FMU (i.e., 630) is delayed for a set sequencing period (e.g., defined in seconds). In other words, 630 may only be permitted to commence upon expiration of the set sequencing period. Prior to expiration, the second FMU may be held as inactive or otherwise prevented from activating. Optionally, the set sequencing period may expire prior to the first FMU reaching a set operational speed setting. Thus, 630 may occur during at least a portion of 620.

In alternative embodiments, activation of the second FMU (i.e., 630) is initiated subsequent to the first FMU reaching the first operational speed setting. In other words, 630 may occur after 620. In some such embodiments, 630 occurs in response to (e.g., immediately following) 620. In other embodiments, 630 is further delayed until a set time period expires following the first FMU reaching the first operational speed setting.

At 640, the method includes increasing a speed setting of the second FMU gradually to a second operational speed setting over a second predetermined ramp period at a second predetermined ramp rate. Thus, 640 generally follows 630 and provides an operational speed setting that is greater than zero. In some embodiments, the second operational speed setting is a predetermined speed setting that generally corresponds to a desired volumetric flow rate for a fluid to flow across or through the second FMU (e.g., separate from the first fluid flow or first operational speed setting). Second predetermined ramp rate is a rate of increase to gradually raise the speed setting of the second FMU (e.g., from zero or rest). The gradual increase may continue over several seconds (e.g., 3 to 5 seconds) and cease in response to the second FMU reaching the first operational speed setting. Once the second operational speed setting is reached, the second FMU may continue to operate at the second operational speed (e.g., until a new operational speed setting is desired for the second FMU, the cooling operation ends, or activation of the second FMU is no longer desired). Advantageously, the gradual increase in speed may be less audibly perceptible (e.g., to a user) than an immediate unrestricted increase from rest to the second operational speed setting.

As noted above, activation of the second FMU may occur prior to the first FMU reaching the first operational speed setting. In some such embodiments, 640 is initiated during the first predetermined ramp period. In alternative embodiments, 640 is initiated only after the first FMU has reached the first operational speed setting.

In certain embodiments, method 600 provides not only for a gradual increase in speed setting of the first FMU and the second FMU, but also a gradual decrease. The gradual decrease may commence after first operational speed setting and the second operational speed setting are reached (e.g., while both the first FMU and the second FMU are actively operating at the first operational speed setting and the second operational speed setting, respectively). In some such embodiments, method 600 includes decreasing the speed setting of the first FMU gradually (e.g., over a first predetermined reduction period, such as might be measured in seconds) from the first operational speed setting at a first predetermined reduction rate. The gradual decrease may continue until, for example, the first FMU reaches a speed setting of zero or is otherwise inactive. Similarly, the method 600 may include decreasing the speed setting of the second FMU gradually (e.g., over a second predetermined reduction period, such as might be measured in seconds) from the second operational speed setting at a second predetermined reduction rate. The gradual decrease may continue until, for example, the second FMU reaches a speed setting of zero is otherwise inactive.

Optionally, the gradual decrease of the second FMU may overlap with the gradual decrease of the first FMU. For instance, as the speed setting of the first FMU decreases, the speed setting of the second FMU may also decrease.

Additionally or alternatively, the gradual decrease of the second FMU may commence only after the gradual decrease of the first FMU has already started.

Also additionally or alternatively, the gradual decrease of the first FMU may be configured to end only after the gradual decrease of the second FMU has ended. Thus, the first FMU may remain active from a time before the second FMU is active to a later time after the second FMU is inactive. In some such embodiments, the gradual decrease of the first FMU may be configured to occur over a predetermined time period corresponding to pressure equalization within a sealed cooling system (e.g., equalization between an evaporator and condenser). For example, the first FMU may be a condenser fan while the second FMU may be a compressor. The condenser fan may thus remain active after the compressor reaches an inactive state and refrigerant pressure within a corresponding sealed cooling system.

Advantageously, noise generated by the first FMU may mask noise generated by the second FMU or sealed cooling system.

In certain embodiments, the first FMU is provided as a variable speed FMU, as described above. Thus, the first FMU may have multiple first operational speed settings. As an example, the first FMU may have a first low speed setting, a first medium speed setting, and a first high speed setting. In some such embodiments, the method 600 further includes increasing the speed setting of the first FMU again (i.e., subsequent to 620). For example, the speed setting of the first FMU may be increased from the first low speed setting to the first medium speed setting or the first high speed setting. Increasing the speed setting of the first FMU again may also occur gradually (e.g., over a predetermined time period at a predetermined ramp rate that is equal to or different from the first predetermined time period and the first predetermined ramp rate, respectively). Similarly, if the method 600 provides for gradual decrease of the first FMU, the method 600 may further provide for decreasing the speed setting of the first FMU (e.g., from the first high speed setting to the first medium speed setting or the first low speed setting).

In additional or alternative embodiments, the second FMU is provided as a variable speed FMU, as described above. Thus, the second FMU may have multiple second operational speed settings. As an example, the second FMU may have a second low speed setting, a second medium speed setting, and a second high speed setting. In some such embodiments, the method 600 further includes increasing the speed setting of the second FMU again (i.e., subsequent to 640). For example, the speed setting of the second FMU may be increased from the second low speed setting to the second medium speed setting or the second high speed setting. Increasing the speed setting of the second FMU again may also occur gradually (e.g., over a predetermined time period at a predetermined ramp rate that is equal to or different from the second predetermined time period and the second predetermined ramp rate, respectively). Similarly, if the method 600 provides for gradual decrease of the second FMU, the method 600 may further provide for decreasing the speed setting of the second FMU (e.g., from the second high speed setting to the second medium speed setting or the second low speed setting).

It is noted that although only two FMUs are listed at FIG. 6, the method 600 may include similar activations of additional FMUs. For instance, a third FMU may be provided and the method 600 may include activating the third FMU subsequent to activating the second FMU to generate a third fluid flow, and increasing a speed setting of the third FMU gradually to a third operational speed setting over a third predetermined time period at a third predetermined ramp rate. In further examples, additional FMUs may be similarly sequentially activated to gradually increase in speed, as would be understood in light of the above description.

In further embodiments, one or more audible electronic elements, which generate one or more undesirable noise is at a generally constant frequency (e.g., an icemaker, a water valve, or a heating element, as described above), are selectively activated as part of the method 600. For instance, the method 600 may include activating the audible electronic element within a set delay period following 610. In some such embodiments, the audible electronic element is activated during 620 or while the first FMU continues to operate at the first operational speed setting. For instance, a heating element may be activated for a defrost operation at an evaporator while a first FMU (e.g., condenser fan) is activate (e.g., during or subsequent to 620). Thus, activation of the audible electronic element may be tailored to overlap with operation of the first FMU and at least a portion of the noise generated by the audible electronic element may be advantageously masked by the noise generated by the first FMU.

Figure 7:
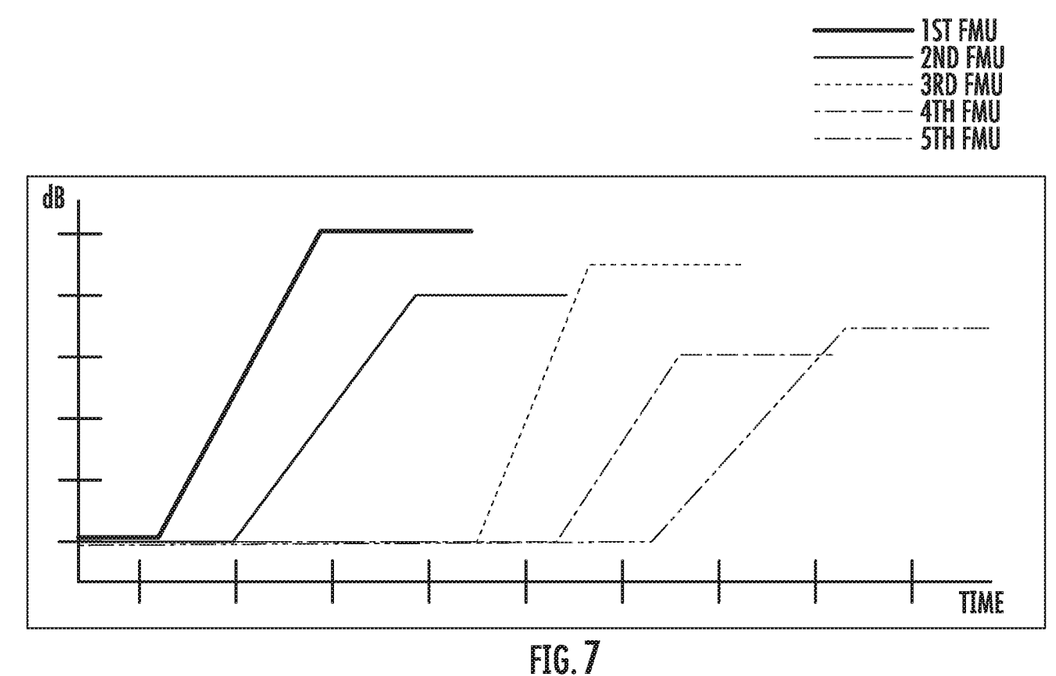
FIG. 7 provides a chart illustrating operation according to exemplary embodiments of the present disclosure.

Turning now to FIG. 7, a chart illustrating noise (as measured in decibels) generated by an exemplary refrigeration appliance (e.g., refrigerator appliance 100—FIG. 1) over time (as measured in seconds). As described above, the exemplary refrigeration appliance may include multiple FMUs such as a first FMU, a second FMU, a third FMU, a fourth FMU, and fifth FMU. Moreover, as is understood each FMU would generate a noise level of 0 while inactive but would gradually increase in noise generation as the corresponding speed setting increases.

Generally, each FMU may be activated separately. In the illustrated chart, the first FMU (e.g., provided as a compressor or, alternatively as a condenser fan) is activated and gradually increases in speed (i.e., the speed setting gradually increases) at a first predetermined ramp rate until an operational speed setting is reached. As the first FMU is increasing in speed, a second FMU (e.g., provided as a condenser fan or, alternatively as a compressor) is activated and gradually increases in speed at a second predetermined ramp rate until a second operational speed setting is reached. After the second FMU reaches the second operational speed setting, a third FMU (e.g., provided as a first evaporator fan) is activated and gradually increases in speed at a third predetermined ramp rate until a third operational speed setting is reached. As the third FMU is increasing in speed, a fourth FMU (e.g., provided as a second evaporator fan) is activated and gradually increases in speed at a fourth predetermined ramp rate until a fourth operational speed setting is reached. As the fourth FMU is increasing in speed, a fifth FMU (e.g., provided as a third evaporator fan) is activated and gradually increases in speed at a fifth predetermined ramp rate until a fifth operational speed setting is reached.

It is noted that although FIG. 7 illustrates a specific sequence of FMUs being activated and increased in speed, alternative embodiments may provide any suitable sequence or speed increase between multiple FMUs in accordance with the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigeration appliance comprising a first fluid-motivating unit (FMU), a second FMU, and a third FMU, the method comprising:
   activating the first FMU to generate a first fluid flow;
   increasing a speed setting of the first FMU gradually to a first operational speed setting over a first predetermined ramp period at a first predetermined ramp rate;
   activating the second FMU subsequent to activating the first FMU to generate a second fluid flow;
   increasing a speed setting of the second FMU gradually to a second operational speed setting over a second predetermined ramp period at a second predetermined ramp rate;
   activating the third FMU subsequent to activating the second FMU to generate a third fluid flow; and
   increasing a speed setting of the third FMU gradually to a third operational speed setting over a third predetermined time period at a third predetermined ramp rate.

2. The method of claim 1, further comprising:
   receiving a cooling signal at the refrigeration appliance, wherein activating the first FMU is in response to receiving the cooling signal.

3. The method of claim 1, wherein the first FMU or the second FMU is a compressor in fluid communication with a sealed cooling system, and wherein the first fluid flow or the second fluid flow is a refrigerant flow through the sealed cooling system.

4. The method of claim 1, wherein the first FMU or the second FMU is a fan in fluid communication with a chilled chamber, and wherein the first fluid flow or the second fluid flow is an airflow through the chilled chamber.

5. The method of claim 1, wherein the refrigeration appliance further comprises an audible electronic element, and wherein the method further comprises:
   activating the audible electronic element within a set delay period following activating the first FMU.

6. The method of claim 1, further comprising:
   decreasing the speed setting of the first FMU gradually from the first operational speed setting over a first predetermined reduction period at a first predetermined reduction rate; and
   decreasing the speed setting of the second FMU gradually from the second operational speed setting over a second predetermined reduction period at a second predetermined reduction rate prior to decreasing the speed setting of the first FMU.

7. The method of claim 1, wherein activating the second FMU is delayed for a set sequencing period following activating the first FMU.

8. The method of claim 1, wherein activating the second FMU is initiated subsequent to the first FMU reaching the first operational speed setting.

9. The method of claim 1, wherein increasing the speed setting of the second FMU is initiated during the first predetermined ramp period.

10. A refrigeration appliance comprising:
    a housing defining a chilled chamber;
    a first fluid-motivating unit (FMU) mounted to the housing to generate a first fluid flow on the refrigeration appliance;
    a second FMU mounted to the housing apart from the first FMU to generate a second fluid flow on the refrigeration appliance;
    a third FMU mounted to the housing apart from the third FMU to generate a third fluid flow of the refrigeration appliance; and
    a controller in operable communication with the first FMU and the second FMU, the controller being configured to initiate a cooling operation, the cooling operation comprising
       activating the first FMU to generate the first fluid flow,
       increasing a speed setting of the first FMU gradually to a first operational speed setting over a first predetermined ramp period at a first predetermined ramp rate,
       activating the second FMU subsequent to activating the first FMU to generate the second fluid flow,
       increasing a speed setting of the second FMU gradually to a second operational speed setting over a second predetermined ramp period at a second predetermined ramp rate,
       activating the third FMU subsequent to activating the second FMU to generate the third fluid flow, and
       increasing a speed setting of the third FMU gradually to a third operational speed setting over a third predetermined time period at a third predetermined ramp rate.

11. The refrigeration appliance of claim 10, wherein the cooling operation further comprises
    receiving a cooling signal at the refrigeration appliance, wherein activating the first FMU is in response to receiving the cooling signal.

12. The refrigeration appliance of claim 10, wherein the first FMU or the second FMU is a compressor in fluid communication with a sealed cooling system, and wherein the first fluid flow or the second fluid flow is a refrigerant flow through the sealed cooling system.

13. The refrigeration appliance of claim 10, wherein the first FMU or the second FMU is a fan in fluid communication with a chilled chamber, and wherein the first fluid flow or the second fluid flow is an airflow through the chilled chamber.

14. The refrigeration appliance of claim 10, further comprising an audible electronic element mounted to the housing, wherein the cooling operation further comprises
    activating the audible electronic element within a set delay period following activating the first FMU.

15. The refrigeration appliance of claim 10, wherein the cooling operation further comprises
    decreasing the speed setting of the first FMU gradually from the first operational speed setting over a first predetermined reduction period at a first predetermined reduction rate, and
    decreasing the speed setting of the second FMU gradually from the second operational speed setting over a second predetermined reduction period at a second predetermined reduction rate prior to decreasing the speed setting of the first FMU.

16. The refrigeration appliance of claim 10, wherein activating the second FMU is delayed for a set sequencing period following activating the first FMU.

17. The refrigeration appliance of claim 10, wherein activating the second FMU is initiated subsequent to the first FMU reaching the first operational speed setting.

18. The refrigeration appliance of claim 10, wherein increasing the speed setting of the second FMU is initiated during the first predetermined ramp period.

19. A method of operating a refrigeration appliance comprising a first fluid-motivating unit (FMU), a second FMU, and a third FMU, the method comprising:

receiving a cooling signal at the refrigeration appliance;
activating the first FMU to generate a first fluid flow;
increasing a speed setting of the first FMU gradually to a first operational speed setting over a first predetermined ramp period at a first predetermined ramp rate in response to receiving the cooling signal;
activating the second FMU subsequent to activating the first FMU to generate a second fluid flow;
activating the third FMU subsequent to activating the second FMU to generate a third fluid flow;
increasing a speed setting of the second FMU gradually to a second operational speed setting over a second predetermined ramp period at a second predetermined ramp rate; and
increasing a speed setting of the third FMU gradually to a third operational speed setting over a third predetermined time period at a third predetermined ramp rate,
wherein the first FMU, the second FMU, or the third FMU is a fan in fluid communication with a chilled chamber, and wherein the first fluid flow, the second fluid flow, or the third fluid flow is an airflow through the chilled chamber.

20. The method of claim 19, further comprising:
decreasing the speed setting of the first FMU gradually from the first operational speed setting over a first predetermined reduction period at a first predetermined reduction rate; and
decreasing the speed setting of the second FMU gradually from the second operational speed setting over a second predetermined reduction period at a second predetermined reduction rate prior to decreasing the speed setting of the first FMU.

* * * * *